US008869296B2

(12) United States Patent
Schultz et al.

(10) Patent No.: US 8,869,296 B2
(45) Date of Patent: Oct. 21, 2014

(54) ACCESS TO USER INFORMATION

(75) Inventors: Paul T. Schultz, Colorado Springs, CO (US); Mark J. Hahn, Stow, MA (US); Robert A. Sartini, Colorado Springs, CO (US); Martin W. McKee, Herndon, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 816 days.

(21) Appl. No.: 12/613,561

(22) Filed: Nov. 6, 2009

(65) Prior Publication Data

US 2011/0113488 A1     May 12, 2011

(51) Int. Cl.
    *G06F 7/04*           (2006.01)
    *G06F 17/30*         (2006.01)
    *H04N 7/16*          (2011.01)
    *G06F 21/62*         (2013.01)
    *G06F 3/048*         (2013.01)
    *H04L 29/06*         (2006.01)

(52) U.S. Cl.
    CPC ............ *G06F 21/6245* (2013.01); *G06F 3/048* (2013.01); *H04L 63/10* (2013.01); *G06F 2221/2107* (2013.01); *G06F 2221/2141* (2013.01)
    USPC ................... 726/27; 726/28; 726/29; 726/30; 713/182; 710/15; 710/17; 710/18

(58) Field of Classification Search
    CPC .............. G06F 21/00; G06F 21/6245; G06F 2221/2141; G06F 2221/2107; H04L 63/10; H04L 63/107; H04L 63/108
    USPC .............. 726/26–30; 713/164, 165, 182, 193; 710/15, 17, 18
See application file for complete search history.

(56) References Cited

U.S. PATENT DOCUMENTS

| | | | |
|---|---|---|---|
| 7,996,005 B2 * | 8/2011 | Lotter et al. ............... | 455/432.3 |
| 2002/0023059 A1 * | 2/2002 | Bari et al. .................... | 705/76 |
| 2002/0082865 A1 * | 6/2002 | Bianco et al. .................... | 705/2 |
| 2003/0046586 A1 * | 3/2003 | Bheemarasetti et al. ..... | 713/201 |
| 2005/0144333 A1 * | 6/2005 | Kotzin ............................ | 710/15 |
| 2005/0232423 A1 * | 10/2005 | Horvitz et al. ................ | 380/255 |
| 2006/0075091 A1 * | 4/2006 | Beyda et al. .................. | 709/224 |
| 2006/0212713 A1 * | 9/2006 | Hatakeda ....................... | 713/182 |
| 2007/0047522 A1 * | 3/2007 | Jefferson et al. .............. | 370/352 |
| 2007/0150608 A1 * | 6/2007 | Randall et al. ................ | 709/228 |
| 2008/0189793 A1 * | 8/2008 | Kirkup et al. .................. | 726/27 |
| 2009/0013388 A1 * | 1/2009 | Holvey et al. .................... | 726/5 |
| 2009/0028179 A1 * | 1/2009 | Albal ............................ | 370/465 |
| 2009/0300704 A1 * | 12/2009 | Boberg et al. ..................... | 726/1 |
| 2010/0064307 A1 * | 3/2010 | Malhotra et al. ................ | 725/24 |
| 2011/0035220 A1 * | 2/2011 | Opaluch ......................... | 704/246 |
| 2013/0276134 A1 * | 10/2013 | Meredith et al. ................ | 726/27 |

* cited by examiner

*Primary Examiner* — Jeffrey Pwu
*Assistant Examiner* — Jayesh Jhaveri

(57) ABSTRACT

A method may include storing user information associated with a first user, where the user information includes at least two of location information, presence information, address book information or calendar information. The method may also include storing access control information identifying criteria for allowing parties to access the user information and receiving, from a first party, a request for access to at least a first portion of the user information. The method may further include determining, based on the access control information, whether the first party is authorized to access the first portion of the user information and providing access to the first portion of the user information, when it is determined that the first party is authorized to access the first portion of the user information.

17 Claims, 8 Drawing Sheets

| USER DATA 610 | ALLOW ANYONE 612 | ALLOW MY REGULAR CONTACTS 614 | ALWAYS ASK ME 616 | ALLOW NO ACCESS 618 |
|---|---|---|---|---|
| LOCATION | | X | | |
| PRESENCE | X | | | |
| ADDRESS BOOK | | | | X |
| CALENDAR | | | X | |
| OTHER | | | X | |

| REQUESTOR 710 | REQUEST EXPIRE TIME 712 | TIME POLICY 714 | LOCATION POLICY 716 | NUMBER OF REQUESTS 718 |
|---|---|---|---|---|
| PAUL SCHULTZ | NEVER | 8:00-17:00 EDT MON-FRI | ONLY NEAR WORK | NO RESTRICTION |
| MARK HAHN | 7/1/2010 | NO RESTRICTION | NO RESTRICTION | NO RESTRICTION |
| TRACK ME APPLICATION | 12/31/2009 | 9:00-20:00 SAT-SUN | NO RESTRICTION | 5 PER DAY |
| FACEBOOK APPLICATION | NEVER | 8:00-17:00 MON-FRI | ONLY NEAR HOME | 10 PER DAY |
| BOB SARTINI | 7/31/2009 | NO RESTRICTION | NO RESTRICTION | NO RESTRICTION |
| MARTY MCKEE | NEVER | 8:00-17:00 MON-FRI | NO RESTRICTION | NO RESTRICTION |

FIG. 7

ACCESS TO USER INFORMATION

BACKGROUND INFORMATION

Common devices, such as personal computers (PCs), mobile phones and personal digital assistants (PDAs), store an increasing amount of information regarding users. For example, PCs often include contacts lists that include addresses and telephone numbers of friends, family, etc. Sharing information between parties, however, is often time consuming. For example, if a user wants to identify an address or telephone number of a party, the user may send an electronic mail (email) message to that party and request the address or telephone number. The receiving party may then receive and read the email message at a later time and respond with a reply email message including the desired information.

BRIEF DESCRIPTION OF THE DRAWINGS

FIGS. 6 and 7 are tables illustrating user-defined authorization information consistent with the processing of FIG. 5.

DETAILED DESCRIPTION OF PREFERRED EMBODIMENTS

The following detailed description refers to the accompanying drawings. The same reference numbers in different drawings may identify the same or similar elements. Also, the following detailed description does not limit the embodiments disclosed herein.

Implementations described herein relate to providing access to user information in an automated manner. In one exemplary implementation, a user may interface with an access management system to set policies and/or criteria associated with allowing others to access his/her information. A party wanting to access the user's information may then contact the access management system and request access. The access management system may then automatically determine whether the party requesting access is permitted to access the information.

Figure 1:
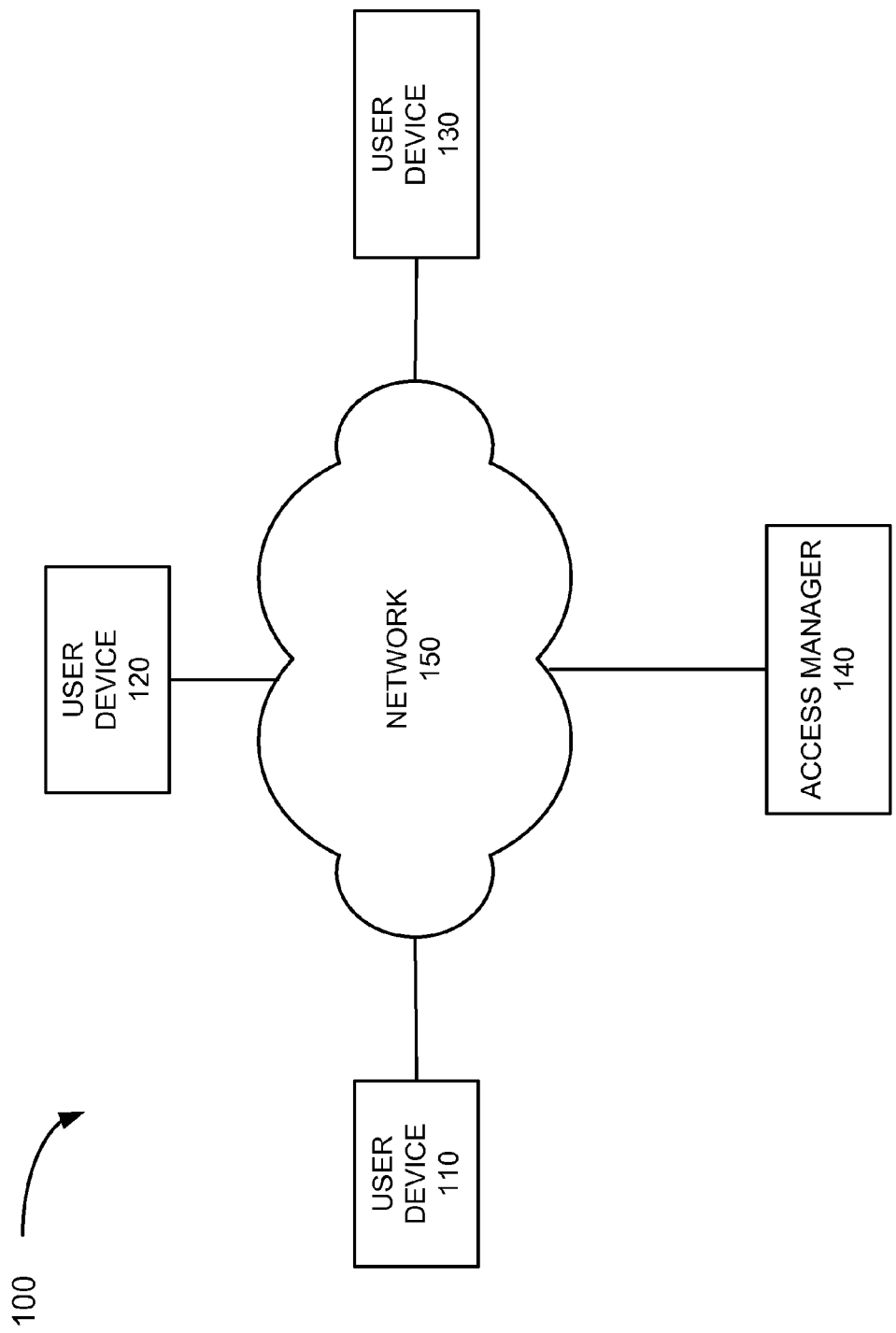
FIG. 1 illustrates an exemplary network in which systems and methods described herein may be implemented.

FIG. 1 is a block diagram of an exemplary network 100 in which systems and methods described herein may be implemented. Network 100 may include user device 110, user device 120, user device 130, access manager 140 and network 150. User devices 110-130 and access manager 140 may connect to network 150 and/or each other via wired, wireless or optical communication mechanisms.

Each of user devices 110-130 may include a cellular radiotelephone, personal digital assistant (PDA), netbook, mobile Internet device (MID) or pager with data communications and/or data processing capabilities. For example, user devices 110-130 may each include a cellular telephone, PDA, MID, web-based appliance or pager that includes a Web browser or other application providing Internet/Intranet access, messaging application programs, such as text messaging, multi-media messaging, instant messaging, short message service (SMS) messaging, email, etc., an organizer application program, a calendar application program and/or a global positioning system (GPS) receiver.

In addition, one or more of user devices 110-130 may include a personal computer (PC), a laptop computer, a palmtop receiver, a game playing device, a television or monitor with a remote control device, and/or any other appliance that may include a radiotelephone transceiver and other applications for providing data processing and data communication functionality.

Access manager 140 may include one or more computing devices, servers and/or systems that are able to connect to network 150 and transmit and/or receive information via network 150. In an exemplary implementation, access manager 140 may allow a user to set policies, criteria and/or preferences with respect to allowing other parties to access the user's otherwise private information. Access manager 140 may also provide these other parties with access to user-private data based on the policy, criteria and/or preference information, as described in detail below.

Network 150 may include one or more wired, wireless and/or optical networks that are capable of receiving and transmitting data, voice and/or video signals, including multimedia signals that include voice, data and video information. For example, network 150 may include one or more public switched telephone networks (PSTNs) or other type of switched network. Network 150 may also include one or more wireless networks and may include a number of transmission towers for receiving wireless signals and forwarding the wireless signals toward the intended destination. Network 150 may further include one or more packet switched networks, such as an Internet protocol (IP) based network, a local area network (LAN), a wide area network (WAN), a personal area network (PAN), a Long Term Evolution (LTE) network, an intranet, the Internet, or another type of network that is capable of transmitting data.

The exemplary configuration illustrated in FIG. 1 is provided for simplicity. It should be understood that a typical network may include more or fewer devices than illustrated in FIG. 1. For example, other devices that facilitate communications between the various entities illustrated in FIG. 1 may also be included in network 100. In addition, network 100 may include thousands or more user devices. Still further, access manager 140 is illustrated as a single device/platform. In some implementations, access manager 140 may include multiple devices and/or multiple access managers 140 distributed across network 100.

Figure 2:
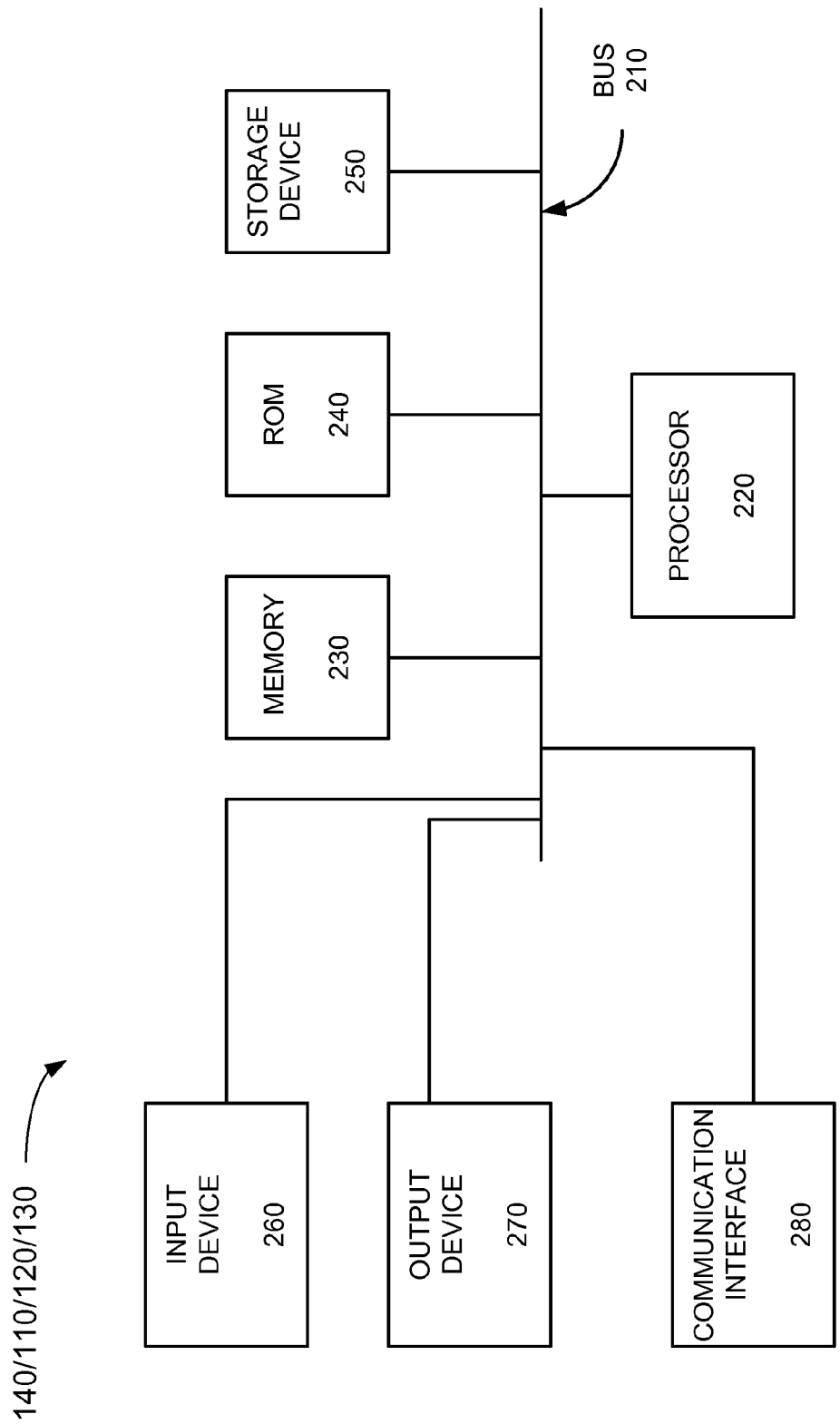
FIG. 2 is a diagram of an exemplary device of FIG. 1.

FIG. 2 is a diagram illustrating components of access manager 140 according to an exemplary implementation. In some implementations, one or more of user devices 110-130 may be configured in a similar manner. Referring to FIG. 2, access manager 140 may include a bus 210, a processor 220, a main memory 230, a read only memory (ROM) 240, a storage device 250, an input device 260, an output device 270, and a communication interface 280. Bus 210 may include a path that permits communication among the elements of access manager 140. It should be understood that access manager 140 may be configured in a number of other ways and may include other or different elements. For example, access manager 140 may include one or more power supplies and one or more modulators, demodulators, encoders, decoders, etc., for processing data.

Processor 220 may include one or more processors, microprocessors, application specific integrated circuits (ASICs), field programmable gate arrays (FPGAs), or other processing logic that may interpret and execute instructions. Memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium (e.g., a hard disk) and its corresponding drive. Storage device 250 may also include a solid state device (SDD).

Input device 260 may include one or more mechanisms that permit a user to input information to access manager 140, such as control keys, a keypad, a microphone, a touch screen, a mouse, a pen, voice recognition and/or biometric mechanisms, a remote control device, etc.

Output device 270 may include one or more mechanisms that output information to the user, including a display, a printer, one or more speakers, etc.

Communication interface 280 may include any transceiver-like mechanism that enables access manager 140 to communicate with other devices and/or systems. For example, communication interface 280 may include mechanisms for communicating via a network, such as a wireless network. In these implementations, communication interface 280 may include one or more radio frequency (RF) transmitters, receivers and/or transceivers and one or more antennas for transmitting and receiving RF data via network 150. Communication interface 280 may also include a modem or an Ethernet interface to a LAN for communicating with other devices in network 100. Communication interface 280 may also include other wired, wireless or optical mechanisms for communicating via a network, such as network 150.

Access manager 140 may provide a platform to allow a user to set criteria and/or policies for allowing other parties to access user-specific information, such as location information, presence information, address information, calendar information, etc. Access manager 140 may also provide a platform for allowing these other parties to access the user-specific information and/or for granting other systems permission to access user-specific information. Access manager 140 may perform these operations in response to processor 220 executing sequences of instructions contained in a computer-readable medium, such as memory 230. A computer-readable medium may be defined as a physical or logical memory device. The software instructions may be read into memory 230 from another computer-readable medium, such as data storage device 250, or from another device via communication interface 280. The software instructions contained in memory 230 may cause processor 220 to perform processes that will be described later. Alternatively, hard-wired circuitry may be used in place of or in combination with software instructions to implement processes consistent with the embodiments described herein. Thus, implementations described herein are not limited to any specific combination of hardware circuitry and software.

Figure 3:
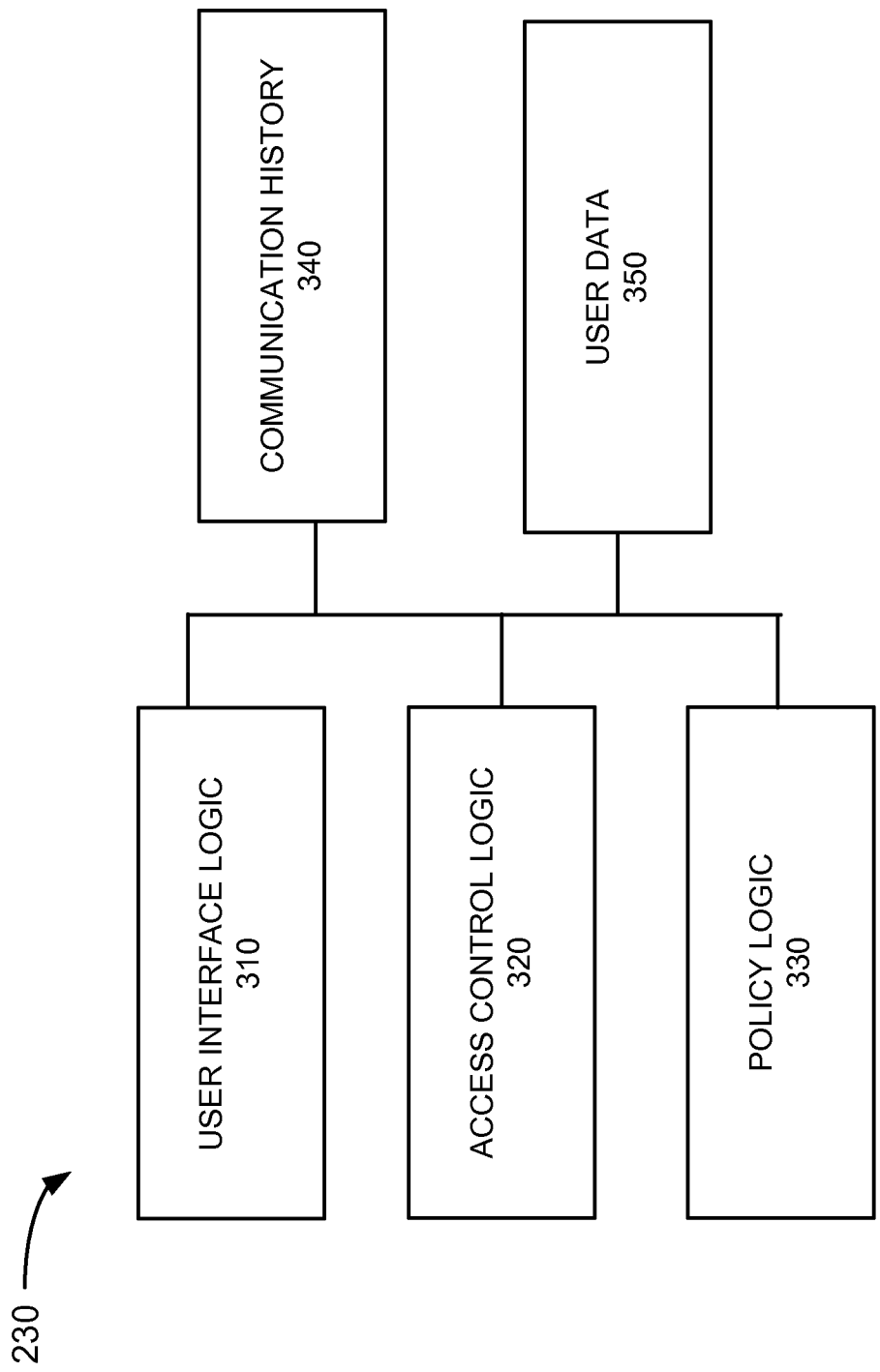
FIG. 3 is a functional diagram of components implemented in the device of FIG. 2.

FIG. 3 is a functional block diagram of access manager 140, according to an exemplary implementation. The logical blocks illustrated in FIG. 3 may be implemented in software, hardware, or a combination of hardware and software. For example, in one implementation, the logical blocks illustrated in FIG. 3 may be implemented by processor 220 (FIG. 2) executing software instructions stored in, for example, memory 230.

Referring to FIG. 3, access manager 140 may include user interface logic 310, access control logic 320, policy logic 330, communication history 340 and user data 350. User interface logic 310 may allow a user to set criteria or preferences associated with providing others with access to user-specific data, such as data stored in user data 350. In an exemplary implementation, user interface logic 310 may provide a graphical user interface (GUI) that allows a user to set various policies, criteria and/or preferences with respect to providing various parties with access to the user's data. In addition, user interface logic 310 may provide the ability to send a message to the user requesting permission to access his/her user-specific information.

Access control logic 320 may be used to control access to the user's data that is stored, for example, in user data 350. Access control logic 320 may control access to the user data based on, for example, information provided via user interface logic 310 and/or information stored in policy logic 330. For example, access control logic 320 may receive a request from a party for access to another party's private data. Access control logic 320 may then determine whether access is to be granted based on previously defined criteria set by the user, such as those stored, for example, in policy logic 330.

Policy logic 330 may store rules and/or criteria associated with accessing user data 350. For example, policy logic 330 may store rules input by a user via user interface logic 310. In one implementation, policy logic 330 may store default rules with respect to accessing user data 350. Users may customize the default rules based on the users' particular preferences. The customized rules may be stored in policy logic 330 for each particular user.

Communication history 340 may store information regarding communications made by parties in network 100. For example, communication history 340 may store information identifying email exchanges, text message exchanges, etc. Such communication history may be used to identify implicit information regarding requesters of information. For example, in one implementation, communication history 340 may be used to identify a user's frequent contacts that may represent friends, family members, co-workers, etc. This information may be used to determine whether to grant a requestor with access to the user's information, as described in detail below.

User data 350 may store information associated with users. For example, user data may store user-specific information that other parties may wish to access. Access control logic 320 may determine whether to allow others to access user data based on information that was provided via user interface logic 310 and is stored in policy logic 330, as described in detail below.

Figure 4:
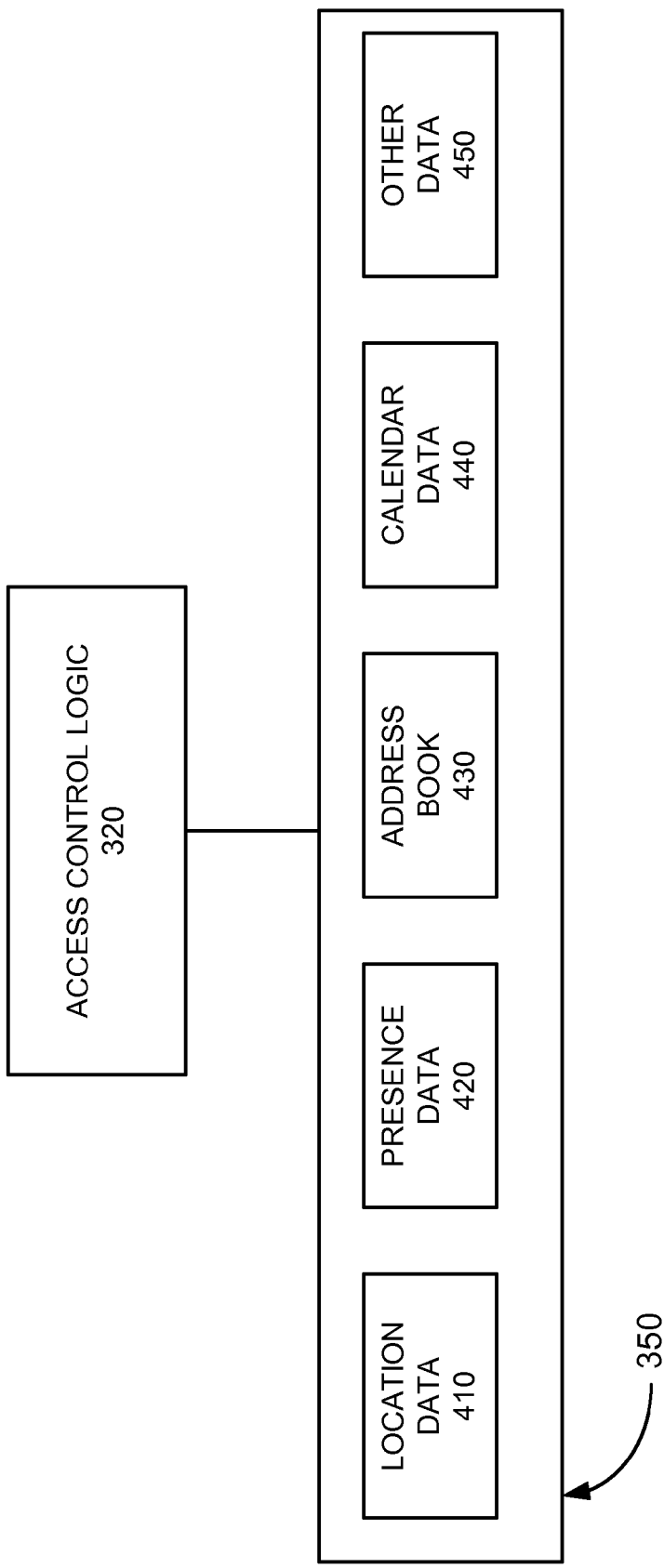
FIG. 4 is a functional diagram illustrating exemplary logic components implemented in the access manager of FIG. 1.

FIG. 4 illustrates a portion of the logic components illustrated in FIG. 3 according to an exemplary implementation. Referring to FIG. 4, access control logic 320 may control access to user data 350, which may include location data 410, presence data 420, address book 430, calendar data 440 and other data 450 associated with a number of parties.

Location data 410 may store physical location information associated with a user. For example, one or more of user devices 110-130 may include a GPS device or other device that allows user devices 110-130 to identify their respective locations. User devices 110-130 may communicate with access manager 140 to provide their location information on a periodic (e.g., every 1 minute, 10 minutes, 30 minutes, etc.) basis. This information may be stored in location data 410. Alternatively, access manager 140 may permit location data to be accessed in real-time from network 150 or one of user devices 110-130.

Presence data 420 may store information identifying whether user devices 110-130 are turned on and/or logged onto a particular program, system and/or network. For example, presence data 420 may store information identifying whether a party associated with user device 110 is logged into a messaging program (e.g., an instant messaging (IM) program or other messaging program). In such instances, the user may set his/her status to available, unavailable, out of the office, on vacation, etc. Parties at user devices 110-130 may change their status at any time and the changed status may be transmitted to access manager 140 and stored in user presence data 420. Alternatively, access manager 140 may permit presence data 420 to be accessed in real-time from network 150 or a presence server.

Address book 430 may store contact information for parties associated with user devices 110-130. For example, address book 430 may store physical addresses, telephone numbers, email addresses, screen names, etc., associated with contacts of parties associated with user devices 110-130. Calendar data 440 may store calendar information associated with parties associated with use devices 110-130. For example, calendar data 440 may store information identifying meetings, action items, etc., along with time information indicating a particular time and/or duration for the meetings, action items, etc.

Other data 450 may store other information associated with users. For example, other data 450 may store a user's pictures, videos, music library, work-related files, financial files, etc. Access control logic 320 may control access to user data 350 based on various factors, as described in detail below.

Figure 5:
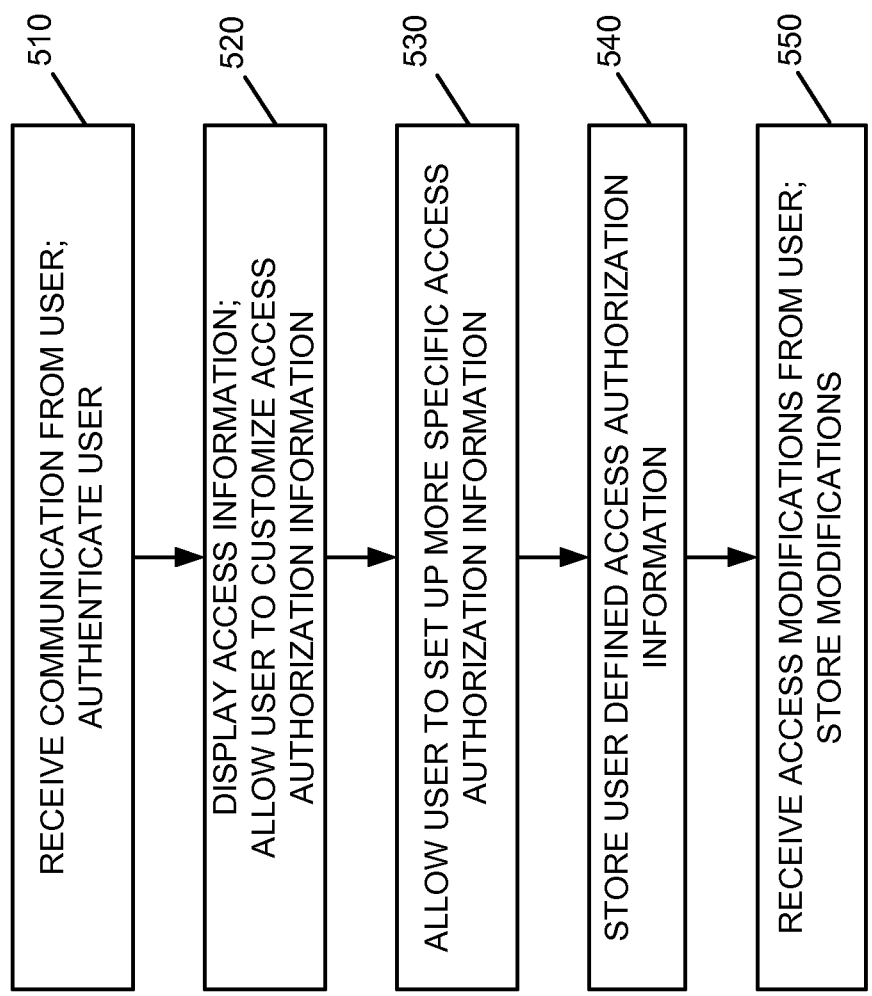
FIG. 5 is a flow diagram illustrating exemplary processing associated with storing user-defined authorization information.

FIG. 5 is a flow diagram illustrating exemplary processing associated with managing authorization to user data. In this example, assume that user device 110 is a communication device, such as a cellular phone, PC, MID, laptop, TV, etc., capable of communicating via a network, such as network 150. Processing may begin with user device 110 contacting access manager 140 via network 150. For example, assume that user device 110 includes a web browser and that the user at user device 110 uses the web browser to enter a web site address associated with access manager 140. Communication interface 280 of user device 110 may then transmit the access request to access manager 140.

Access manager 140 may receive the communication/access request from the user at user device 110 (act 510). User interface logic 310 of access manager 140 may provide a log on screen that allows the user associated with user device 110 to provide a user name and/or password to authenticate the user (act 510). Assume that user interface logic 310 verifies the user name and password.

Figure 6:

User interface logic 310 may then provide a GUI showing the user's access rules or default access rules/information if the log on to access manager 140 is the user's first interaction with access manager 140 (act 520). For example, user interface logic 310 may display interactive table 600 illustrated in FIG. 6. Referring to FIG. 6, table 600 may include user data field 610, allow anyone field 612, allow my regular contacts field 614, always ask me field 616 and allow no access field 618. User data field 610 may be used to identify various types of user data or applications for which the user would like to control access.

For example, entry 620 in field 610 lists location data. Location data may refer to a physical location of user device 110 (and correspondingly the user associated with user device 110) that is stored in location data 410. For example, assume that user device 110 is a cell phone that includes a GPS device that communicates its location to access manager 140, which stores the location in location data 410. In some instances, other parties may wish to access the location of user device 110.

Entry 630 in field 610 lists presence data. Presence data may refer to a status of a user with respect to a particular program that is stored in presence data 420. For example, assume that the user of user device 110 is logged into an IM program or an interactive chat program. The IM/chat program may allow the user to provide a status indicator, such as logged on, unavailable, busy, etc. Additionally, presence data 420 may include rich presence information, such as "on the phone," "at the ball game," "in an executive meeting," etc. This rich presence information may allow information to be sent to the user based on the particular situation, such as sending information to the user only if it is important. In some instances, other parties may want to be aware of the user's presence information.

Entry 640 in field 610 lists address book. An address book may refer to an address book, contact list, buddy list, etc., stored in address book 430. The information in the address book may indentify names, telephone numbers, email addresses, screen names, etc., of parties associated with the user of user device 110.

Entry 650 in field 610 lists calendar. A calendar may refer to a calendar application stored in calendar data 440 that provides schedule information for the user of user device 110. In some instances, other parties (e.g., co-workers, friends, etc.) may want to be aware of the user's calendar/schedule information.

Entry 660 may correspond to other types of data associated with a user. For example, as discussed above with respect to FIG. 4, other data 450 may store pictures, videos, music files work-related files, etc., associated with the user of user device 110. In some instances, other parties (e.g., family members, co-workers, etc.) may wish to access this other information.

Fields 612-618 may be used to identify various levels of access for the different types of user data in user data field 610. For example, allow anyone field 612, if selected/checked, may indicate that anyone is allowed to access the corresponding information listed in user data field 610. Allow my regular contacts field 614, if checked/selected, may indicate that only regular contacts are allowed to access the corresponding information (or type of information) listed in user data field 610. The user may also provide criteria for identifying regular contacts. For example, the user may indicate that a party with whom he/she has exchanged two or more emails in a month may be designated as a regular contact. Additionally, the user may designate his/her social network contacts/friends as regular contacts.

Always ask me field 616, if checked/selected, may indicate that the user of user device 110 is always to be contacted before allowing access to the corresponding information listed in user data field 610. Allow no access field 618, if checked/selected, may indicate that no one is allowed access to the corresponding information listed in user data field 610.

The user associated with user device 110 may then customize the information stored in table 600 based on his/her preferences (act 520). For example, suppose that the user would like to allow his/her regular contacts with access to his/her location. In this case, the user may select field 614 in entry 620. User interface logic 310 may receive the selection and provide an "X" or other indicator in field 614 of entry 620. Further suppose that the user would like to allow anyone to see his/her presence. In this case, the user may select field 612 in entry 630, as indicated by the "X."

Similarly, suppose that the user would like to allow no one with access to his/her address book and require explicit permission for someone to access to his/her calendar or other information. In this case, the user may select field 618 in entry 640 and field 616 in entries 650 and 660, as indicated by the "X's" in these fields. In some implementations, table 600 may be pre-populated with selections based on default selections.

In such a case, the user may modify the default selections based on his/her preferences as described above.

In some implementations, access manager 140 may allow the user to set up more specific access control criteria (act 530). For example, user interface logic 310 may provide a GUI or table that allows the user to set up policies that expire (e.g., analogous to a lease) based on various criteria, such as the particular requestor (e.g., the person or application requesting access), time (e.g., a time to live for a request, time of day/day of week, etc.), location (e.g., access only granted when user is in a particular location), number of requests (e.g., a requester can access user's calendar a certain number of times per week), frequency (e.g., a requester can access location data once per hour), granularity (e.g., a requester can only see my location data in terms of the nearest city/town), selectivity (e.g., different requestors may be granted different access to a given user's data), or other factors.

As an example, user interface logic 310 may allow the user to further customize information associated with any of the types of user data illustrated in user data field 610 by, for example, clicking on the particular entry, right clicking on the entry, using a menu, etc. In this case, assume that the user has selected location data for further access control customization. User interface logic 310 may then provide interactive table 700 illustrated in FIG. 7. Referring to FIG. 7, table 700 may include requestor field 710, request expire time field 712, time policy field 714, location policy field 716 and number of requests field 718. The user may populate requestor field 710 with entries identifying friends, family co-workers, other applications, etc.

For example, referring to FIG. 7, the user may enter information in field 710 of entries 720, 730, 760 and 770 that identify the names of the user's co-workers, friends, family, etc. The user may also enter in field 710 of entries 740 and 750 the names of applications (e.g., Track Me and Facebook) that may be associated with requests for user information.

Fields 712-718 may be used to identify various criteria for the different entities in requestor field 710, as described in detail below. For example, request expire time field 712 may be used to indicate an expiration time associated with requesting location data. For example, the user may enter "never" in field 712 of entries 720, 750 and 770 indicating that there is no expiration time after which a request will not be granted. Alternatively, the user may enter a particular day, as illustrated in field 712 of entries 730, 740 and 760 indicating a time after which the requestor listed in requestor field 710 will no longer be able to receive location data.

Time policy field 714 may be used to indicate particular times or ranges of time at which a request may be granted. For example, the user may enter ranges of time in field 714 of entries 720, 740, 750 and 770 (e.g., 8:00-17:00 Monday-Friday, 9:00-20:00 Saturday-Sunday, etc.) indicating ranges of time in which requests for location data will be granted. The user may also enter "no restrictions," as illustrated in field 714 of entries 730 and 760 indicating that requests may be granted any time of day and any day of the week.

Location policy field 716 may be used to indicate locations/regions associated with requests that may be granted. For example, the user may enter general locations/areas in field 716 of entries 720 and 750 (only near work, only near home, etc.) indicating locations/regions associated with the location of user device 110 for which requests for location data will be granted. The user may also define criteria associated with "near work," "near home," etc. For example, the user may define near work as being within a 30 mile radius of the user's work location. The user may also enter "no restriction," as illustrated in field 716 of entries 730, 740, 760 and 770 indicating that requests may be granted regardless of the location of user device 110.

Number of requests field 718 may be used to indicate a number of requests or frequency of requests for location data that may be granted to a requestor listed in requestor field 710. For example, the user may enter a number of times per day in field 718 of entries 740 and 750 (five per day, ten per day, etc.) indicating the frequency or number of times for which a request for location data will be granted. The user may also enter "no restriction," as illustrated in field 718 of entries 720, 730, 760 and 770 indicating that requests from the requestors listed in requestor field 710 of entries 720, 730, 760 and 77 may be granted regardless of the number of times that the requestor requested location data.

In some implementations, user interface logic 310 may simplify the user's task associated with populating table 700. For example, user interface logic 310 may provide drop down boxes, menus, etc., that allow the user to simply select various information for populating table 700. In each case, access manager 140 may store the user defined access authorization information in policy logic 330 (act 540). The user may further customize authorization information associated with presence data, address book data, calendar data and other data, in a similar manner to that described above with respect to location data.

In some instances, the user associated with user device 110 may wish to modify his/her access control information at a later time. In such a case, the user at user device 110 may access access manager 140, provide his/her log in information and be provided with his/her access authorization information (e.g., tables 600, 700, etc.). The user may then provide his/her modifications. User interface logic 310 may then store the modifications in policy logic 330 (act 550).

For example, assume that the user would like to remove the party listed in entry 760 (e.g., Bob) from accessing his/her location information since that party is no longer a co-worker. In this case, the user at user device 110 may delete entry 760 from table 700. In such an instance, the party listed in entry 760 may still be able to obtain location information via the general default access controls provided via table 600.

As another example, assume that the user associated with user device 110 is a business professional from Colorado and is planning to visit New York on a business trip for one week (e.g., five days). In this case, the user may change his/her access authorization information to allow a number of colleagues that he/she is working with to access his/her location, presence and calendar at any time during the five days of the trip. The user may also allow a supplier that he/she is working with to access his location and calendar during the five days only when his location is New York. In such a scenario, if the user takes a quick trip to, for example, Boston during the week, the supplier will not be able to access his/her location or calendar while the user is in Boston. In this case, the user at user device 110 may provide customized information associated with location data, presence data and calendar data in a similar manner to that described above with respect to table 700 to provide the appropriate inputs identifying the access controls and access manager 140 will store the access authorization information in policy logic 330. Access manager 140 may then provide the parties with the desired access, as described in more detail below.

As still another example, assume that the user associated with user device 110 is planning to go on a two week vacation. In this case, the user may decide to let two key colleagues, his/her boss, and his/her house sitter, to have access to some of his personal data. For example, the user may modify the access data to let his/her boss and house sitter have full access to his/her data (e.g., location data, presence data, address book and calendar) during the two weeks. The user may also allow his/her two colleagues to access his presence data during business hours. In this case, the user at user device 110 may provide customized information associated with location data, presence data, address book and calendar data in a similar manner to that described above with respect to table 700 to provide the appropriate inputs identifying the access controls and access manager 140 will store the access authorization information in policy logic 330. Access manager 140 may then provide the parties with the desired access, as described in more detail below.

In this manner, a user may update his/her access control information at any time and access manager 140 may immediately make the changes to the user's access controls and provide access based on the user-provided information, as described in detail below.

As described above, user data 350 may store the user data for a large number of users (e.g., thousands or more) and policy logic 330 may store corresponding access control information for each of the users' data. For example, users associated with user devices 120 and 130 may store access control information associated with their data in a similar manner as described above.

Figure 8:
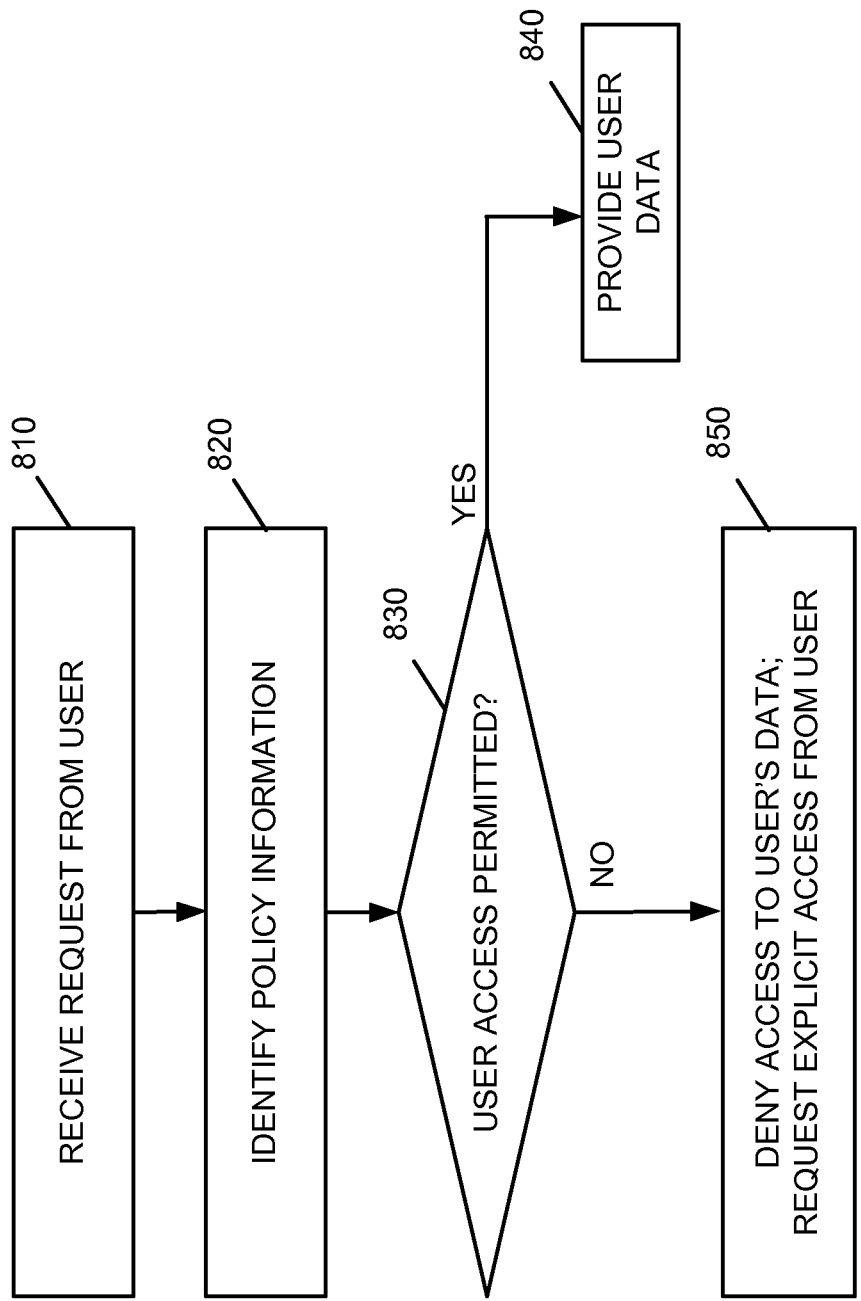
FIG. 8 is a flow diagram illustrating exemplary processing associated with providing access to user information.

FIG. 8 illustrates exemplary processing associated with a party accessing user data, such as user data 350. Processing may begin with a user at user device 120 accessing access manager 140 to request access to data associated with user device 110. For example, the user at user device 120 may use a web browser to enter the web site address associated with access manager 140 into user device 120. Communication interface 280 of user device 120 may then transmit the access request to access manager 140. Alternatively, the user at user device 120 may use an application on user device 120 that makes requests to access manager 140 for access to user-specific information associated with the user at user device 110.

Assume that access manager 140 receives the request (act 810). User interface logic 310 may provide a GUI to allow a user to request particular types of data, such as data stored in user data 350. For example, the user may enter the name of the user associated with user device 110. Access manager 140 may then identify access policy information associated with accessing user data associated with user device 110 (act 820). For example, access control logic 320 may access policy logic 330 and determine whether the user associated with user device 120 may access location data associated with user device 110 (act 830).

In this case, assume that the access manager 140 identifies user device 120 as being associated with the requestor in entry 720 (i.e., Paul Schultz). Referring to FIG. 7, the requestor in entry 720 is authorized to receive location information between 8:00 AM and 5:00 PM Monday through Friday when user device 110 is near work. In this case, assume that access manager 140 determines that it is 10:00 AM on Tuesday and that user device 110 is located within an area that corresponds to "near work" (e.g., is within a 30 mile radius of the work location).

In this scenario, access control logic 320 may provide the location of user device 110 to user device 120 (act 840). For example, access control logic 320 and/or user interface logic 310 may provide the location to user device 120 via text, (e.g., a street address, city and state). Alternatively, access control logic 320 and/or user interface logic 310 may provide the location as a location via a graphical map, along with the address in text form.

If, however, access manager 140 determines that it is not between 8:00 AM and 5:00 PM on Monday through Friday (e.g., 10:00 AM on Saturday) or user device 110 is not located within an area that corresponds to "near work" (e.g., is 200 miles away from work), access manager 140 may deny access to the user's location (act 850).

As described above with respect to FIG. 6, in some instances, a user may require that access to the user's data requires explicit authorization. For example, suppose that the user at user device 120 is requesting access to the user at user device 110's calendar. As illustrated in FIG. 6, field 616 in entry 650 (i.e., calendar data entry) indicates that the user at user device 110 must be asked before access to the calendar data is granted. In this case, access control logic 320 may send an access authorization request via communication interface 280 to user device 110 (act 850). For example, access control logic 320 may transmit a text-based message, such as an SMS, IM, etc., to user device 110 indicating "Marty wants to see your calendar. Press or reply "1" if access is permitted and press or reply "2" if access is not permitted."

If the user at user device 110 responds with "1," access to the calendar data will be permitted. If, however, the user responds with "2" or does not respond, access may be denied. In some instances, if access is denied (e.g., the user inputs "2" or the user does not respond), the user at user device 120 will be provided with a message indicating that the party at user device 110 has denied the access request. In other instances, access manager 140 may provide no message to indicate that access has been explicitly denied or may provide a generic message indicating that access is not permitted at this time. Still further, in some implementations, access control logic 320 may not transmit an authorization request to user device 110 if the status of the user associated with user device 110 indicates "do not disturb." This may help avoid unwanted interruptions to the user.

In some implementations, access manager 140 may provide reciprocity with respect to providing access to user data 350. For example, if party B wishes to track a location of party A and party B has allowed party A access to his/her location data, access manager 140 may automatically grant party B with access to location information of party A. However, party A may override that access by explicitly modifying his/her access controls for his/her location data as described above. That is, party A may explicitly require permission to access this information or permit no one to access his/her location information.

As also described above, access manager 140 may leverage a user's communication history (e.g., to implicitly identify frequent contacts). Access manager 140 may also leverage other data, such as personal data (e.g., contact list/address book/buddy lists, calendar, social network friends list, etc.) to facilitate implicit authorization of access to a user's data. For example, if access to particular information is limited to regular contacts, access manager 140 may identify regular contacts by accessing a user's address book to identify frequent contacts.

In still other implementations, access manager 140 may support distributed authorization for data access requests, such as when data requests come from an application (e.g., Facebook, Loopt, or other third party application) on behalf of another user. For example, if access to particular information is limited to contacts/friends, access manager 140 may contact a different third party application to identify friends/contacts to attempt to determine whether a requestor is a contact or friend that may have access to the information of interest.

Implementations described herein allow users to control access to their heterogeneous personal data. That is, access to many different types of user data may be provided via a single platform/system. In addition, implementations described herein allow users to easily manage and/or change authorization controls associated with allowing access to their data.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, various features have been mainly described above with respect to a managing access to user information stored in access manager 140. In other implementations, access manager 140 may control access to user data stored elsewhere, such as in the particular user devices (e.g., user devices 110-130) or in another system (e.g., a location server, a presence server). In such implementations, once access manager 140 determines whether access is to be granted, access manager 140 may retrieve the information of interest from the appropriate device/system and provide the information of interest to the requestor. Alternatively, access manager 140 may grant the requesting application or user permission to access the data via another system (e.g., a location server, a presence server).

In addition, various features have been described above with respect to FIG. 8 with a user requesting access to another party's otherwise private data. In some implementations, a user desiring access to another party's information may not have to actually request access to the other party's data. For example, suppose that a party at user device 120 accesses access manager 140. Access manager 140 may automatically determine what information the party at user device 120 is able to view with respect to users at, for example, user devices 110 and 130. Access manager 140 may then automatically provide this information to the party at user device 120. For example, access manager 140 may automatically provide an icon and/or name associated with the users at user devices 110 and 130, along with the corresponding user-specific information that the party at user device 120 is permitted to access. In this manner, a party accessing access manager 140 may be automatically provided with various user-specific information of other parties. In some instances, access manager 140 may automatically provide the party at user device 120 with information associated with other parties that correspond to regular contacts, friends, family, social network, etc., of the party at user device 120. This may help avoid providing unwanted information to the party at user device 120 when he/she first accesses access manager 140.

In addition, as described above, some requests may require explicit user authorization. In some instances, access manager 140 may request authorization in manners other than text-based message requests. For example, access manager 140 may support multimedia messaging sessions (MMS) in which access manager 140 may "pop" a picture of the party trying to access the user's data along with text identifying the subject matter of the request. In still other implementations, access manager 140 may support voice sessions for obtaining explicit authorization. For example, access manager 140 may include an automated speech recognition system that provides a voice message to a user, such as "Marty is trying to access your calendar. Do you approve?" The automated speech recognition system in access manager 140 may identify the response and grant/not grant access based on the response. The automated speech recognition system in access manager 140 may also leverage voice biometrics to authenticate the requestor and provide the user with a voice message, such as "Marty has been voice authenticated and is trying to access your calendar. Do you approve?"

Still further, in some implementations, access manager 140 may control other types of requests for a user. For example, a user may provide authorization constraints to access manager 140 associated with allowing parties to contact the user. As one example, the user may provide information identifying how many messages or how frequently a party can contact the user, such as how often family members can send SMS, IM or MMS messages to the user during work hours. The user may also provide information indicating, for example, that friends cannot send SMS and MMS messages to the user during work hours, the user has a quota of ten messages/day while at work, etc. Access manager 140 may then manage communications to the user based on the user-defined control information.

In addition, although not described above, when determining location information, access manager 140 may support various levels of granularity or precision with respect to providing the location information. For example, access manager 140 may provide rounding precision to a user defined or a default threshold, such as rounding latitude/longitude information to, for example, three significant digits, provide radius precision within five miles, one kilometer, etc. Still further, location mapping may be provided within one block, within a neighborhood, within a city, within a state, etc.

In addition, although not described above, in some implementations, access manager 140 may allow users to identify different levels of granularity with respect to accessing user-related information. For example, in some instances, a user may allow some parties to access complete meeting details associated with his/her calendar data, while allow other parties to access only the meeting title and duration. Similarly, in some instances, a user may allow parties to access presence data as merely busy or available, as opposed to more detailed status, such as "on travel," "on vacation," "in meeting with boss," etc.

As another example, the user may allow access to his/her address book information to be provided with different levels of access. For example, one requestor may be provided with complete contact information, while another requestor may be provided with only the name and business phone number, while still a different requestor may be provided with name and address information. Again, the level of granularity provided to requestors may be set by the user.

Still further, in some implementations, a user may leverage the user's social network data to provide different levels of access to the user's data. For example, a user may provide information to access manager 140 indicating that "friends" are permitted to see my location, people in my work network can see my presence, family members can see my calendar, etc. In this manner, a user may apply different access to various groups in different social networks.

Further, while series of acts have been described with respect to FIGS. 5 and 8, the order of the acts may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   storing user information associated with a first user, the user information including address book information, calendar information and at least one of location information or presence information;
   storing access control information, the access control information identifying criteria for allowing parties other than the first user to access the user information, wherein the access control information includes at least two of time information indicating when the parties are authorized to access at least some of the user information, location information associated with the first user's location, or requestor identifier information identifying the parties,
   receiving, from a first party, a request for access to at least a first portion of the user information, wherein the first portion of the user information includes at least one of the address book information or the calendar information;
   determining, in response to the request and based on the access control information, whether the first party is authorized to access the first portion of the user information; and
   providing access to the first portion of the user information, in response to determining that the first party is authorized to access the first portion of the user information,
   wherein the determining further comprises:
      performing an implicit authorization determination by accessing the first user's address book or contact list to determine whether the first party is authorized to access the first portion of the user information.

2. The method of claim 1, further comprising:
   receiving, from the first user, the time information indicating when the first party is authorized to access the first portion of the user information,
   wherein the storing access control information comprises:
      storing the time information, and
   wherein the determining further comprises:
      determining, based on the time information, whether the first party is authorized to access the first portion of the user information.

3. The method of claim 1, further comprising:
   receiving, from the first user, the location information, the location information indicating geographic limitations defining when the first party is authorized to access the first portion of the user information,
   wherein the storing access control information comprises:
      storing the location information, and
   wherein the determining further comprises:
      determining, based on the location information, whether the first party is authorized to access the first portion of the user information.

4. The method of claim 1, further comprising:
   receiving, from the first user, frequency information indicating how frequently the first party is allowed to access the first portion of the user information,
   wherein the storing access control information comprises:
      storing the frequency information, and
   wherein the determining further comprises:
      determining, based on the frequency information, whether the first party is authorized to access the first portion of the user information.

5. The method of claim 1, wherein the storing access control information comprises:
   storing information indicating that parties identified as regular contacts or friends are to be granted access to the first portion of the user information.

6. The method of claim 5, further comprising:
   determining whether the first party is a regular contact or friend based on at least one of communication history between the first user and the first party or information obtained via an external program.

7. The method of claim 1, further comprising:
   providing a graphical user interface (GUI) configured to allow the first user to input the access control information.

8. The method of claim 7, further comprising:
   receiving, via the GUI, information identifying the at least two of time information, location information or requestor identifier information,
   wherein the determining further comprises:
      using the time information, location information and requestor identifier information to determine whether the first party is authorized to access the first portion of the user information.

9. The method of claim 1, wherein the access control information indicates that a request for access to the first portion of the user information requires explicit authorization from the first user.

10. The method of claim 9, further comprising:
    transmitting, based on the access control information, a message to the first user, the message requesting permission to grant access to the first portion of the user information;
    receiving a response from the first user; and
    determining whether to provide access based on the received response.

11. The method of claim 1, further comprising:
    identifying access control information associated with the first party accessing the user information associated with the first user; and
    automatically providing corresponding access to the first party to user information associated with the first user based on the access control information associated with the first user.

12. The method of claim 1, further comprising:
storing user information associated with a plurality of users;
receiving access control information from each of the plurality of users; and
controlling access to the user information associated with each of the plurality of users based on the access control information received from each of the respective plurality of users.

13. A device, comprising:
a communication interface configured to receive communications from other devices;
a memory configured to store information associated with a plurality of users, the information including address book information, calendar information and at least one of location information or presence information; and
logic configured to:
provide a graphical user interface (GUI) configured to receive, from a first user, user-defined criteria for controlling access to information associated with the first user, wherein the user defined criteria include at least two of time information indicating a time period when each of a plurality of parties is authorized to access the information associated with the first user, frequency information indicating how frequently each of the plurality of parties is permitted to access information associated with the first user, or requestor identifier information identifying each of the plurality of parties,
receive requests, via the communication interface and subsequent to receiving the user-defined criteria, for information stored in the memory,
control access to the information stored in the memory based on the user-defined criteria,
receive a request from a first party, via the communication interface, for a first type of information associated with the first user, wherein the first type of information includes at least one of the address book information or the calendar information, and
determine, based on the first type of information and the user-defined criteria, whether the first party is authorized to access the information associated with the first user stored in the memory,
wherein when determining, the logic is further configured to:
perform an implicit authorization determination by accessing the first user's address book or contact list to determine whether the first party is authorized to access the information associated with the first user.

14. The device of claim 13, wherein the logic is further configured to:
transmit a message, via the communication interface, to the first user to determine whether the first party is authorized to access the information associated with the first user.

15. A non-transitory computer-readable medium having stored thereon sequences of instructions which, when executed by at least one processor, cause the at least one processor to:
provide a graphical user interface (GUI) configured to allow users to input user-defined access control information associated with accessing address book information, calendar information and at least one of location information or presence information;
receive, from a first party, a request for access to at least a first portion of information associated with a first user, wherein the first portion of information includes at least one of the address book information or the calendar information;
determine, in response to the request and based on user-defined access control information input by the first user, whether the first party is authorized to access the first portion of information, wherein the user-defined access control information comprises at least two of time information associated with requests, location information associated with the first user, or requestor identifier information; and
provide access to the first portion of information, in response to determining that the first party is authorized to access the first portion of information,
wherein when determining, the instructions cause the at least one processor to:
perform an implicit authorization determination by accessing the first user's address book or contact list to determine whether the first party is authorized to access the first portion of information.

16. The non-transitory computer-readable medium of claim 15, further including instructions that cause the at least one processor to:
allow the users to modify the user-defined access control information.

17. The non-transitory computer-readable medium of claim 15, wherein the time information indicates a time period when the first party is permitted access to information associated with the first user, and the location information indicates a current location of the first user.

* * * * *